(12) United States Patent
Lennon

(10) Patent No.: US 10,167,006 B2
(45) Date of Patent: Jan. 1, 2019

(54) DOCK CART COVER

(71) Applicant: Boates LLC, Port Jefferson, NY (US)

(72) Inventor: Michele Lennon, Port Jefferson, NY (US)

(73) Assignee: Boates LLC, Port Jefferson, NY (US)

(*) Notice: Subject to any disclaimer, the term of this patent is extended or adjusted under 35 U.S.C. 154(b) by 0 days.

(21) Appl. No.: 15/437,953

(22) Filed: Feb. 21, 2017

(65) Prior Publication Data

US 2018/0237049 A1    Aug. 23, 2018

(51) Int. Cl.
| | |
|---|---|
| *B62B 5/00* | (2006.01) |
| *A44B 99/00* | (2010.01) |
| *A44B 19/00* | (2006.01) |
| *B62B 1/10* | (2006.01) |

(52) U.S. Cl.
CPC ............ *B62B 5/0013* (2013.01); *A44B 19/00* (2013.01); *A44B 99/00* (2013.01); *B62B 1/10* (2013.01)

(58) Field of Classification Search
CPC ..... B62B 9/142; B62B 3/1436; B62B 3/1464; B62B 5/0013; B62B 5/069; B62B 9/10; B62B 9/14; B62B 5/00; A46B 17/06; A44B 19/00
USPC .......... 296/77.1, 110, 136.07, 136.1, 79, 83; 280/33.992, DIG. 5, 728.2, 736, 741; 135/88.02, 115, 117, 119, 96
See application file for complete search history.

(56) References Cited

U.S. PATENT DOCUMENTS

| | | | |
|---|---|---|---|
| 916,439 A | 3/1909 | Grover | |
| 1,121,878 A | 12/1914 | Sherman | |
| 1,257,206 A | 2/1918 | Fernbach | |
| 2,789,863 A | 4/1957 | Shimabukuro | |
| 3,227,484 A | 1/1966 | Merclean | |
| 3,834,756 A | 9/1974 | Grell | |
| 4,098,536 A | 7/1978 | Mills | |
| 6,260,566 B1 * | 7/2001 | LaFave | B62J 17/08 135/88.01 |
| 6,742,792 B1 * | 6/2004 | Hooper | B62B 3/002 150/154 |
| 6,916,059 B2 * | 7/2005 | Feinberg | B60J 5/00 296/145 |
| 9,352,636 B1 * | 5/2016 | Johnson | B60J 1/20 |
| 2002/0038941 A1 * | 4/2002 | Erickson | A61G 12/001 280/79.2 |
| 2009/0102148 A1 | 4/2009 | Bruner | |
| 2010/0066119 A1 | 3/2010 | Levine et al. | |
| 2013/0294002 A1 * | 11/2013 | Thompson | H05F 3/00 361/212 |
| 2016/0129927 A1 * | 5/2016 | Russell | B62B 3/1436 280/33.992 |

* cited by examiner

*Primary Examiner* — D Glenn Dayoan
*Assistant Examiner* — Sunsurraye Westbrook
(74) *Attorney, Agent, or Firm* — Carter, DeLuca, Farrell & Schmidt, LLP; George Likourezos

(57) ABSTRACT

The present disclosure is directed to a dock cart cover, including a lower portion, and a tensioning device. The lower portion is dimensioned to fit about the sides of the dock cart. The tensioning strap may selectively apply tension inward about the sides of the dock cart. The dock cart cover may include an upper portion which may be expanded upward from the lower portion. The dock cart cover may be attached to dock carts in either an expanded state or a collapsed state.

11 Claims, 4 Drawing Sheets

DOCK CART COVER

TECHNICAL FIELD

The present disclosure relates to a dock cart and, more particularly, to a dock cart cover and a method of installing a dock cart cover on a dock cart.

BACKGROUND

Dock carts are used to perform a variety of tasks. Often, they are used to transport, temporarily store, and protect goods as they are transported to and from varying locations along a dock or buildings and structures proximate thereto. Dock carts also come in a variety of shapes and sizes, often for storing and transporting a differing goods of varying composition, structure, and weight.

Due to weather concerns, the cargo located in a dock cart while in use may be subject to rain, sun, wind, or other such similar conditions which may adversely affect the contents and/or stability of the dock cart. As such, it would be advantageous to develop systems and methods to protect dock cart cargo while in use.

SUMMARY

According to aspects of the present disclosure, a dock cart cover includes a lower portion and a tensioning device. The lower portion is dimensioned to fit about the sides of a dock cart and the tensioning device applies tension inward about the sides of the dock cart.

In aspects, the dock cart cover may further include a lower portion which includes a membrane made of a hydrophobic material.

In other aspects, the membrane of the dock cart cover may include a reflective material.

According to aspects, the tensioning device may include a variable strap and a receiving strap. The variable strap may be configured to engage the receiving strap thereon.

In aspects, the dock cart cover may further include an upper portion attached to the lower portion. The upper portion may extend from the lower portion upward and enclose a cavity therein.

In yet another aspect, the upper portion may further include a membrane made of a hydrophobic material.

According to additional aspects, the membrane of the upper portion may include a reflective material.

According to yet another aspect, the membrane of the lower portion and the membrane of the upper portion may be formed of a single membrane.

In aspects, the dock cart cover may further include a male strap fastener, and a female strap fastener. The male strap fastener and female strap fastener may be dimensioned to be fixably engaged. The male strap fastener may further be coupled to the upper portion and the female strap fastener may further be coupled to the lower portion thereon.

According to additional aspects, the dock cart cover may further include a male strap fastener, a female strap fastener, and a tensioning strap coupled to the upper portion. The male strap fastener may be coupled to the tensioning strap and dimensioned to fixably engage with the female strap fastener.

In aspects, the dock cart of claim 5, further comprising a compartment located along the upper portion thereon.

In additional aspects, the compartment may further include a first compartment enclosure and a second compartment enclosure.

According to additional aspects, the compartment may further include a zipper. The zipper may be configured to selectively couple the first compartment enclosure to the second compartment enclosure According to aspects of the present disclosure, a method of installing a dock cart cover may include placing a lower portion around a dock cart, and tensioning a variable strap and a receiving strap attached to the lower portion.

According to additional aspects, the method may further include separating a male strap fastener from a female strap fastener, and expanding the dock cart cover from a collapsed state to an expanded state.

In yet another aspect, the method may further include collapsing an upper portion into a cavity of the dock cart, and attaching a female strap fastener to a male strap fastener. The female strap fastener and male strap fastener may apply tension about the upper portion so as to create a flat top surface.

In another aspect, a method of storing a dock cart cover may include collapsing a membrane of a dock cart cover, locating the membrane of the dock cart cover in a compartment, the compartment located on the dock cart cover, and inverting the compartment about the membrane of the dock cart cover.

According to additional aspects, the method may further include engaging a zipper attached to a first compartment enclosure and a second compartment enclosure.

Although embodiments of the present disclosure are described in detail with reference to the accompanying drawings for the purpose of illustration and description, it is to be understood that the disclosed embodiments are not to be construed as limited thereby. It will be apparent to those of ordinary skill in the art that various modifications and/or combinations to the foregoing embodiments may be made without departing from the scope of the present disclosure.

BRIEF DESCRIPTION OF THE DRAWINGS

The accompanying drawings, which are incorporated in and constitute a part of the specification, illustrate embodiments of the disclosure and, together with a general description of the disclosure given above, and the detailed description of the embodiment(s) given below, explain the principles of the disclosure.

DETAILED DESCRIPTION OF THE DRAWINGS

Figure 1:
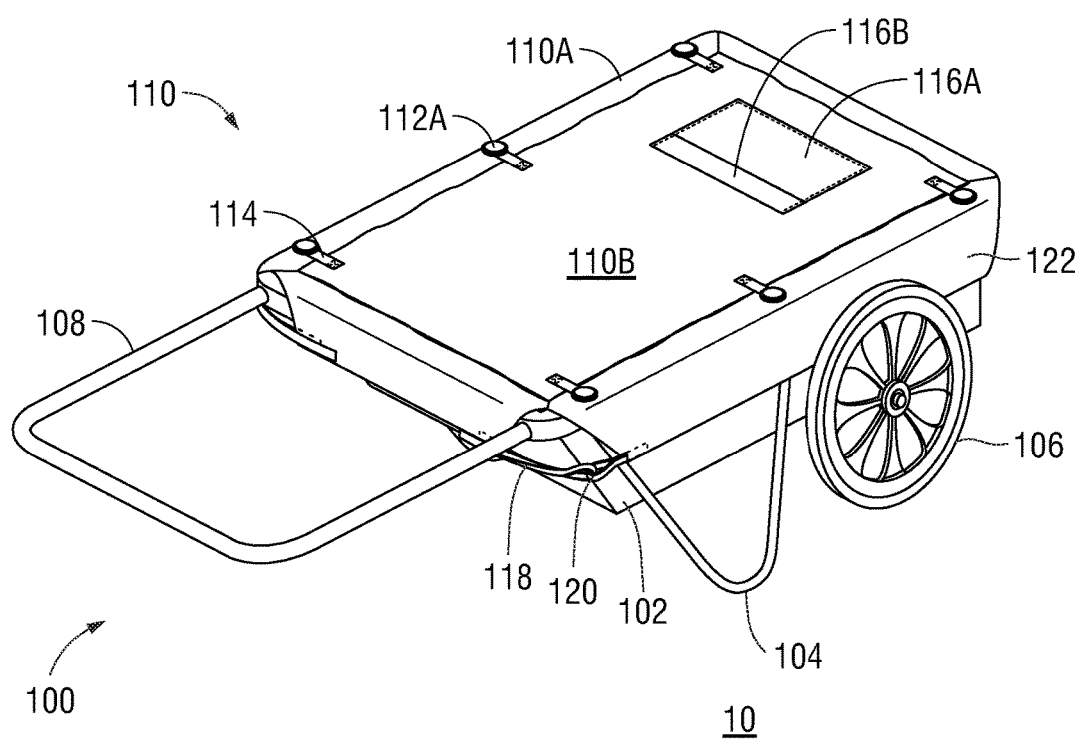
FIG. 1 is a perspective view of a dock cart including a dock cart cover in a collapsed state.

Embodiments of the present disclosure are described in detail with reference to the drawings, in which like reference numerals designate identical or corresponding elements in each of the several views.

As used herein, the term "proximal" refers to portions of the dock cart closer to an individual engaging with the dock cart via a handle. Alternatively, as used herein, the term "distal" refers to portions of the dock cart further from an individual engaging with the dock cart via the handle.

As will be described in detail below, provided are embodiments of a dock cart cover. The dock cart cover includes an upper portion and a lower portion, the upper portion collapsing into the lower portion when in a collapsed state relative to the dock cart. Peripheral straps may be used to secure the dock cart cover to the dock cart. Additionally, top straps may be used to take in any excess material or slack when the dock cart cover is in a collapsed state relative to the dock cart.

To secure the dock cart cover, after an individual places goods into a dock cart, the cover is positioned above the contents in either a collapsed or expanded state relative to the cargo. The individual then secures the cover to the cart by tightening the peripheral straps to each other, thereby tensioning the membrane of the dock cart cover.

Referring initially to FIG. 1 and FIG. 3-5, one embodiment of a cart system is shown and is designated generally 10. The cart system 10 includes a dock cart 100 and a dock cart cover 110. The dock cart 100 includes a plurality of sides 102, a handle 108, fixed supports 104 and wheels 106. The sides 102 define a cavity (not shown) which may receive objects for transport and storage to, from, and along a dock. The handle protrudes outward from the top of the sides 102 parallel to the top of the dock cart sides, though in alternative embodiments the handle may protrude at a variety of angles. The fixed supports 104 extend downward relative to the plurality of sides 102, thereby supporting a proximal region of the dock cart. Two wheels 206 located distally relative to the fixed supports 104 are secured to the sides of the dock cart along a distal portion thereof. An example of a suitable dock cart includes the Taylor Made Products® Dock Pro™ Dock Cart.

With continued reference to FIG. 1 and FIGS. 3-5, a dock cart cover 110 is shown in a collapsed state. The dock cart cover 110 includes a lower portion 110A and an upper portion 110B. A plurality of tensioning straps 114 are fixed to the upper portion 110B and further include female strap fasteners 112A which are fixed thereon and designed to engage with male strap fasteners 112B fixed to the lower portion 110A. The male strap fasteners 112A may be male-to-female snap fasteners, male-to-female clips, magnetic fasteners or other suitable fasteners. Two variable straps 118 and receiving straps 120 operably engage and are secured to the lower portion 110A. The dock cart cover 110 further includes a compartment 116 located along a portion of the upper portion 110B. It is contemplated that the variable straps 118 and receiving straps 120 may be replaced with other tensioning devices, such as elastic bands, ropes, or other suitable tensioning devices.

Further, it is contemplated that the male strap fastener 112B may be replaced with a button or other suitable object dimensioned to fit through an opening along the tensioning strap 114 (not shown). To secure the tensioning strap 114 to the button or object, the button or object may be fixed to the membrane of the lower portion 110A and inserted through the opening along the tensioning strap 114. To release the tensioning strap 114 from the button or object, the individual would insert the button or object again through the opening along the tensioning strap 114.

It is further contemplated that both the variable strap 118 and receiving strap 120 may be replaced with a continuous tensioning strap (not shown). The continuous tensioning strap may be made of any elastic fabric band, rubber band, or any other similar band and/or cord which are capable of maintaining tension while the dock cart cover 110 is placed on a dock cart 100.

The lower portion 110A is constructed of a membrane and dimensioned to fit around the sides 102 of the dock cart 100. The membrane may be constructed of any material suitable to protect the contents of the dock cart 100 while in use. Membrane materials may include, but are not limited to, synthetic fabrics such as polyester or nylon, natural fabrics such as wool, cotton, or canvas, or semi-synthetic combinations thereof. The lower portion 110A includes flanges 122 which, when placed on a dock cart 100, extend downward. The flanges 122 have variable straps 118 and receiving straps 120 which are sewn to the flanges 122. It is contemplated that the variable straps 118 and receiving straps 120 may be fixed to the flanges 122 in a variety of ways, such as with adhesives such as fabric glue, via engagement with male and female snap buttons, etc. The receiving strap 120 is folded onto itself prior to fixation to the membrane of the lower portion 110A leaving a portion of the receiving strap 120 as a loop for reception of the variable strap 118. The variable strap 118 includes a Velcro®-based fabric fastener located along the variable strap 118 at a first position 118A and a second position 118B. It is contemplated that the variable strap 118 may include other fasteners, such as male-female snap fasteners, buttons, or other suitable fasteners for coupling fabrics together.

When the dock cart cover 110 is positioned on the dock cart 100, upon engagement the variable strap 118 and receiving strap 120 attach around the handle 108, fixing upward movement of the dock cart cover 110 to a predetermined travel distance. As a result, when in the expanded position (see FIG. 2) the dock cart cover remains fixed to the dock cart 100 in response to lateral force being applied to the dock cart cover 110. Lateral forces may include wind, or contact with an object such as an individual, table, or other similar objects. Likewise, lateral or upward forces applied to the dock cart cover 110 as cargo located in the cavity of the dock cart 100 and dock cart cover 110 shifts may, upon application, be received by the dock cart cover 110 and subsequently transferred to the dock cart 100.

The female strap fasteners 112A are located along the lower portion 110A of the dock cart cover 110. Corresponding male strap fasteners 112B are coupled to tensioning straps 114 which correspond to the female strap fasteners 112A. The tensioning straps 114 may be made of a durable material, such the materials listed in regard to the membrane of the lower portion 110A. The tensioning straps 114 are fixed to the upper portion 110B of the dock cart cover 110. When the dock cart cover 110 is in the collapsed state, the female strap fasteners 112A and male strap fasteners 112B engage to retain the dock cart cover 110 in the collapsed state (see FIG. 5).

Figure 2:
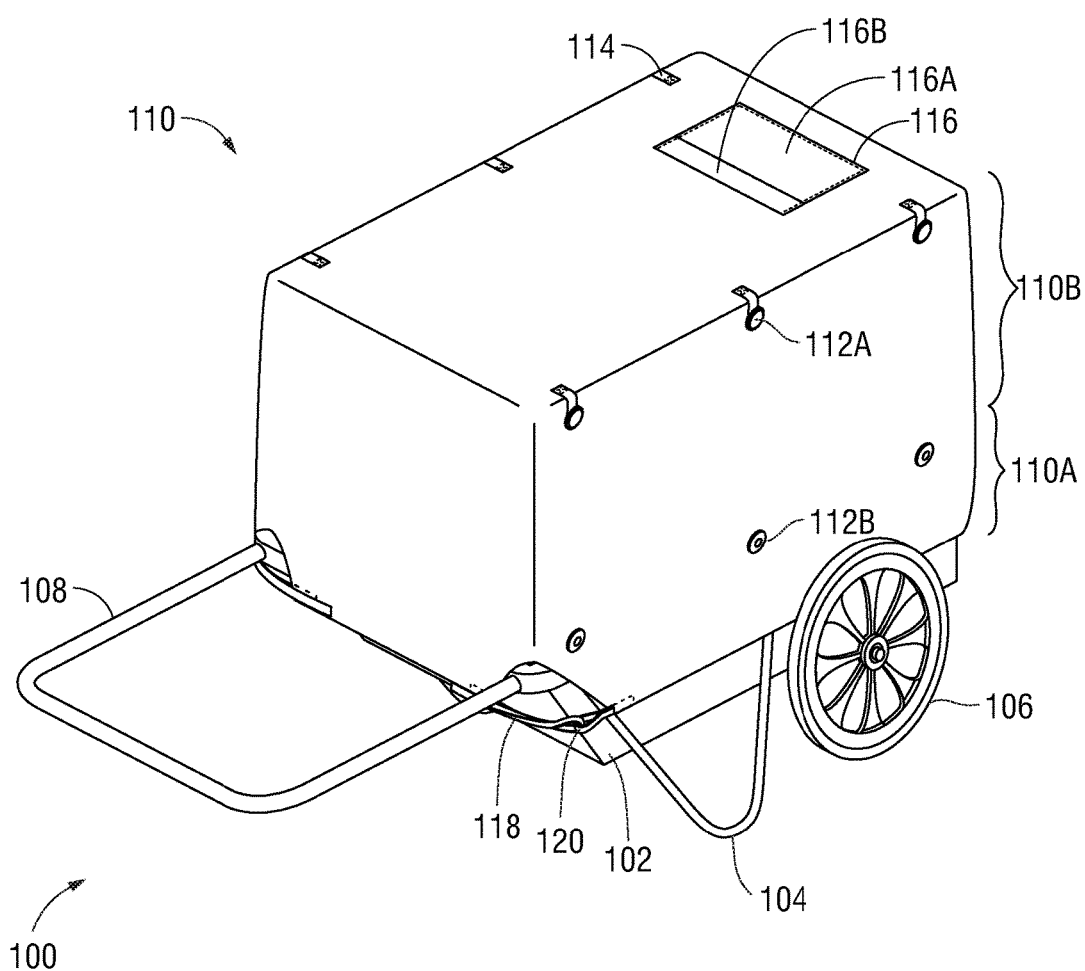
FIG. 2 is a perspective view of the dock cart of FIG. 1 in an expanded state.
Figure 3:
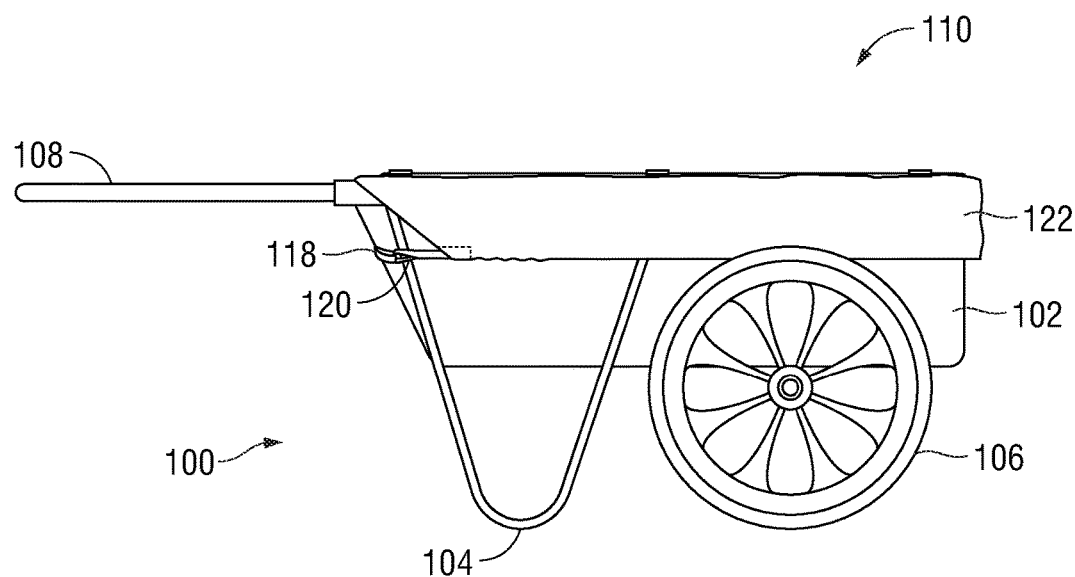
FIG. 3 is a side plan view of the dock cart of FIG. 1.
Figure 4:
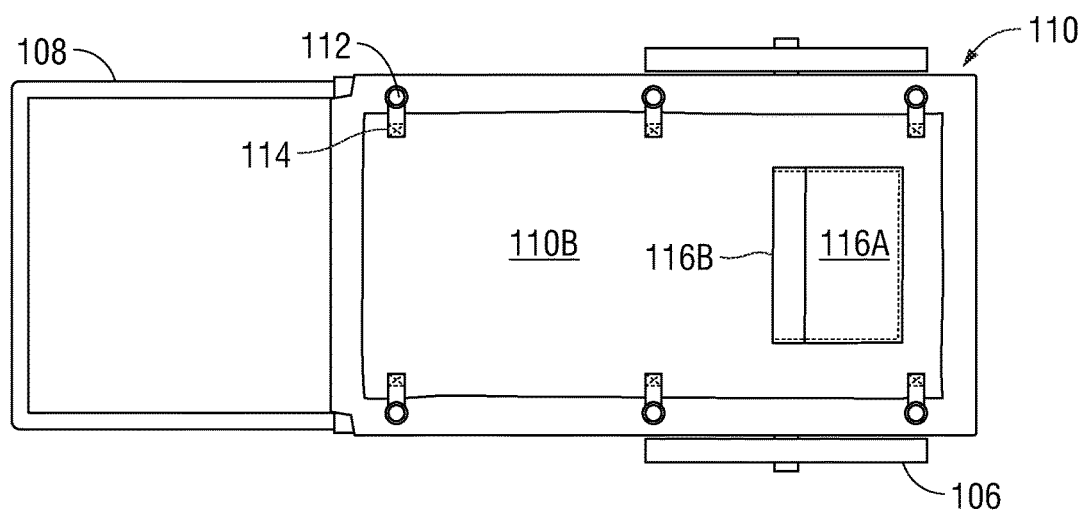
FIG. 4 is a top plan view of the dock cart of FIG. 1.
Figure 5:
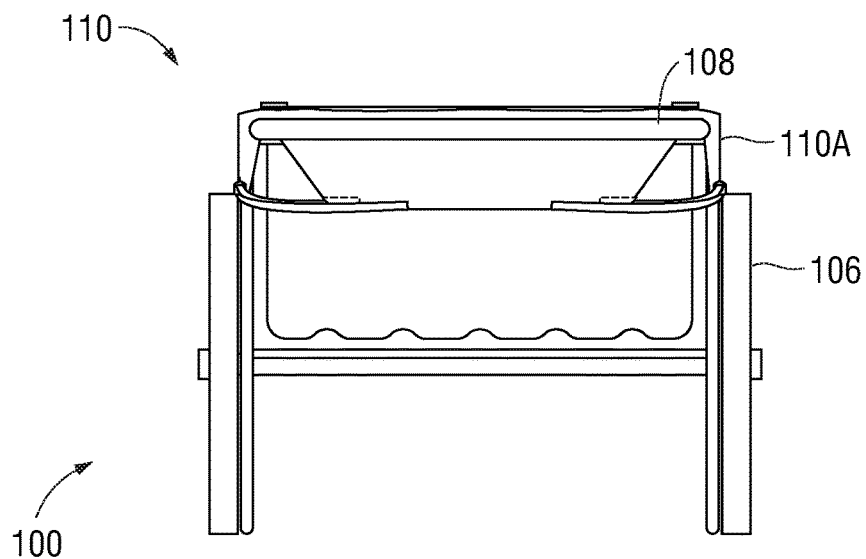
FIG. 5 is a front plan view of the dock cart of FIG. 1.
Figure 6:
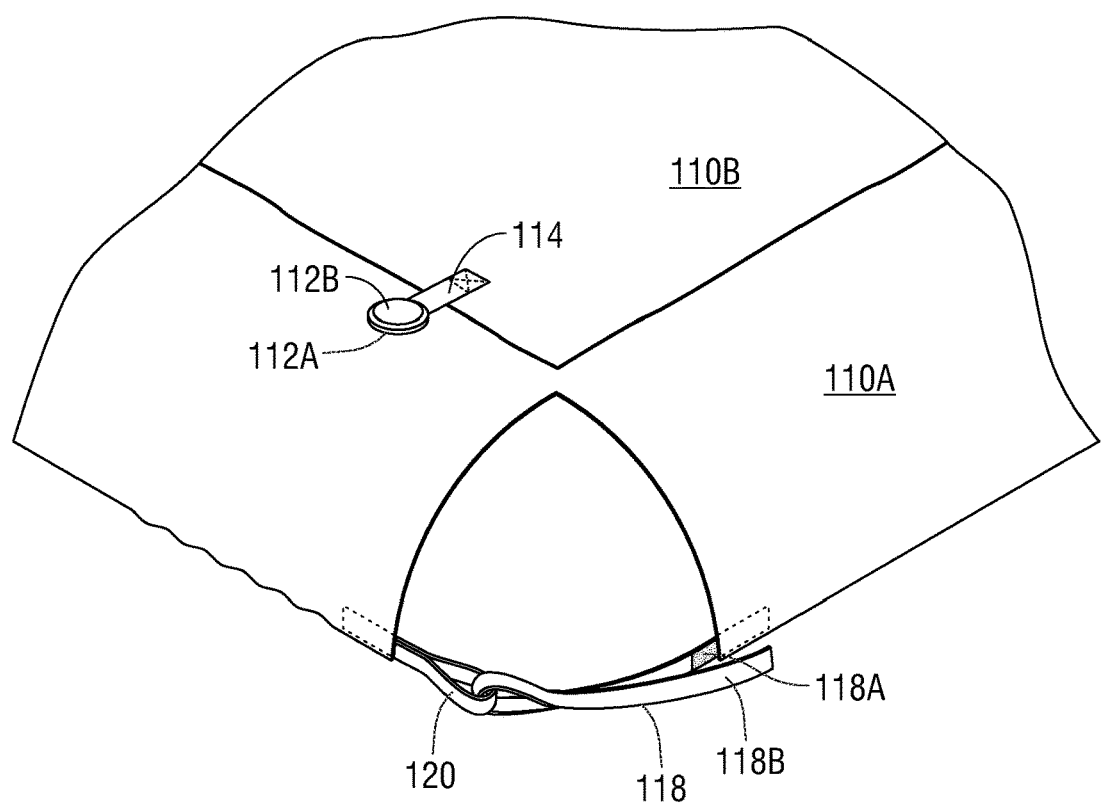
FIG. 6 is a detailed view of a portion of the dock cart cover of FIG. 1.

The upper portion 110B is constructed of a membrane which, as shown in FIG. 2, is seamlessly attached to the lower portion 110A. In alternative embodiments, the upper portion 110B and lower portion 110A may include membranes constructed of varying materials. The membrane of the upper portion 110B may be constructed of any material suitable to enclose and protect the contents of the dock cart 100 while in use. Membrane materials may include, but are not limited to, synthetic fabrics such as polyester or nylon, natural fabrics such as wool, cotton, or canvas, or semi-synthetic combinations thereof.

When the dock cart cover 110 is in the collapsed state, the upper portion 110B and lower portion 110A located between the female strap fasteners 112A and male strap fasteners 112B is condensed therebetween. Additionally, when the dock cart cover 110 is in the collapsed state and is engaged with the dock cart 100, the segment of the upper portion located between the tensioning straps 114 is pulled taught, thereby creating a flat surface. As a result, in the collapsed state, when water comes into contact with the upper portion 110B the water does not collect or puddle. It is further contemplated that the upper portion 110B and lower portion 110A may be constructed or coated with hydrophobic materials and/or hydrophobic substances such as Gore-Tex®. Additionally, or alternatively, the upper portion 110B and lower portion 110A may be made of a reflective material to increase the visibility of the dock cart cover, and by extension the dock cart, at times when lighting would not be optimal for visibility purposes.

Referring to FIG. 2, when the dock cart cover 110 is in an expanded state the upper portion 110B extends upward relative to the lower portion 110A. It is contemplated that a plurality of straps (not shown) may engage with the female strap fasteners 112A and male strap fasteners 112B to compress the upper portion 110B over cargo located in the cavity of the dock cart 100. Further, in the expanded state the dock cart cover 110 creates a second cavity (not shown) which is dimensioned to surround a predetermined maximum volume of cargo which does not fit below the top of the sides 102 of the dock cart 100.

A compartment 116 (or pouch) is located along the upper portion 110B of the dock cart cover 110. The compartment 116 includes a first compartment enclosure 116A and a second compartment enclosure 116B. The first compartment enclosure 116A and second compartment enclosure 116B may be constructed of a woven nylon mesh or other netted material allowing for the permeation of air therethrough. The first compartment enclosure 116A and second compartment enclosure 116B may be constructed of other durable materials such synthetic fabrics such, natural fabrics, or semi-synthetic combinations. The first compartment enclosure 116A and the second compartment enclosure 116B may be attached via a zipper (not shown), or other fasteners, thereby allowing an individual to seal the contents of the compartment 116 once stowed in the compartment.

In use, the dock cart cover 110 may be collapsed into a non-use state. While the dock cart cover 110 is detached from the dock cart 100, the membrane of the dock cart cover 110 may be fold and/or compressed to fit into the compartment 116. Once the dock cart cover 110 is collapsed, the compartment 116 may be inverted so as to encompass the membrane of the dock cart cover 110. Once the membrane of the dock cart cover 110 is located in the compartment 116, a zipper or other fastener (not shown) may be engaged to secure the membrane of the dock cart cover 110 in the compartment 116.

With continued reference to FIG. 1, in use, an individual places the dock cart cover 110 in either a collapsed or expanded position over the dock cart 100. As the dock cart cover 110 is placed over the sides 102 of the dock cart 100, the variable straps 118 and receiving straps 120 remain unengaged or engaged in a distended position so as to allow the flanges 122 to be located around the sides 102 of the dock cart 100.

After the flanges 122 are located along the exterior of the sides 102, the individual threads the variable strap 118 through the receiving strap 120 if not already threaded and tensions the variable strap 118 prior to securing the first position 118A and the second position 118B to one another. The individual repeats this process for as many variable straps 118 and corresponding receiving straps 120 as are located along the flanges 122. As a result of securing the flanges 122, tension is directed inward relative to the sides 102 by the flanges, preventing any slack or excess material of the flanges 122 from coming into contact with the wheels 106 while the dock cart 100 is in motion.

Once the dock cart cover 110 has been secured to the dock cart 100, the individual then secures the corresponding female strap fasteners 112A and male strap fasteners 112B to tension the upper portion 110B located therebetween.

To expand the dock cart cover 110, the individual releases the female strap fasteners 112A from the male strap fasteners 112B. As a result, the upper portion 110B located between the female strap fasteners 112A and the male strap fasteners 112B are allowed to expand upward relative to the dock cart 100, thereby increasing the available volume of the cavity created therein.

It will be understood that various modifications may be made to the embodiments of the presently disclosed dock cart cover 110. Therefore, the above description should not be construed as limiting, but merely as exemplifications of embodiments. Those skilled in the art will envision other modifications within the scope and spirit of the present disclosure.

What is claimed is:

1. A dock cart cover, comprising:
   a lower portion;
   an upper portion disposed above the lower portion;
   a tensioning device coupled to the lower portion; and
   a plurality of tension straps, each tension strap including:
      a female fastener coupled to either the upper portion or the lower portion, and
      a male fastener coupled to either the upper portion or the lower portion,
   wherein the lower portion is dimensioned to fit about sides of a dock cart and the tensioning device is configured to apply tension inward about sides of the dock cart, and
   wherein the plurality of tension straps in combination with the tensioning device apply a flattening tension along the upper portion located at a plane different from a plane formed by sides of the dock cart cover when in a collapsed state.

2. The dock cart cover of claim 1, wherein the lower portion includes a membrane made of a hydrophobic material.

3. The dock cart cover of claim 2, wherein the membrane includes a reflective material.

4. The dock cart cover of claim 1, wherein the tensioning device includes a variable strap and a receiving strap, the variable strap configured to engage the receiving strap thereon.

5. The dock cart cover of claim 4, further comprising:
   an upper portion attached to the lower portion, wherein the upper portion extends from the lower portion upward and encloses a cavity therein.

6. The dock cart cover of claim 5, wherein the upper portion further includes a membrane made of a hydrophobic material.

7. The dock cart cover of claim 5, wherein a membrane of the upper portion includes a reflective material.

8. The dock cart cover of claim 6, wherein the membrane of the lower portion and the membrane of the upper portion form a single membrane.

9. The dock cart cover of claim 5, further comprising a compartment located along the upper portion thereon.

10. The dock cart cover of claim 9, wherein the compartment further includes a first compartment enclosure and a second compartment enclosure.

11. The dock cart cover of claim 10, further comprising a zipper, wherein the zipper is configured to selectively couple the first compartment enclosure to the second compartment enclosure.

\* \* \* \* \*